United States Patent [19]

Archer

[11] Patent Number: 4,606,180
[45] Date of Patent: Aug. 19, 1986

[54] GARDENING TOOL

[76] Inventor: Gene R. Archer, 8225 Gale Rd. Southwest, Hebron, Ohio 43025

[21] Appl. No.: 660,809

[22] Filed: Oct. 15, 1984

[51] Int. Cl.$^4$ ............................................. A01D 7/00
[52] U.S. Cl. ............................ 56/400.11; 56/400.19; 56/400.21
[58] Field of Search ........... 56/400.01, 400.21, 400.17, 56/375, 400.04, 400.11, 400.19; 172/379, 376

[56] References Cited

U.S. PATENT DOCUMENTS

| | | | |
|---|---|---|---|
| 395,721 | 1/1889 | Steiner | 56/400.21 |
| 849,304 | 4/1907 | Whitted | 56/400.21 |
| 1,096,342 | 5/1914 | Alexander | 56/400.1 |
| 1,514,291 | 11/1924 | Kimber | 56/400.21 |
| 1,548,906 | 8/1925 | Schroer | 56/400.21 X |
| 2,036,807 | 4/1936 | Honn | 56/400.21 X |
| 3,522,850 | 8/1970 | Pede | 172/376 |
| 3,654,754 | 4/1972 | Scoggin | 56/400.17 |

FOREIGN PATENT DOCUMENTS

| | | | |
|---|---|---|---|
| 46062 | 2/1889 | Fed. Rep. of Germany ... | 56/400.01 |
| 201783 | 6/1923 | United Kingdom ............. | 56/400.01 |

Primary Examiner—Richard J. Johnson
Attorney, Agent, or Firm—Robert B. Watkins

[57] ABSTRACT

This invention involves a gardening tool used as a rake where the tines of the rake are removably affixed to a bridge element. In the preferred embodiment circumferential banding clamps are used in conjunction with a sinuous wave shaped tines made of spring steel to affix the tines to the bridge of the gardening tool.

17 Claims, 15 Drawing Figures

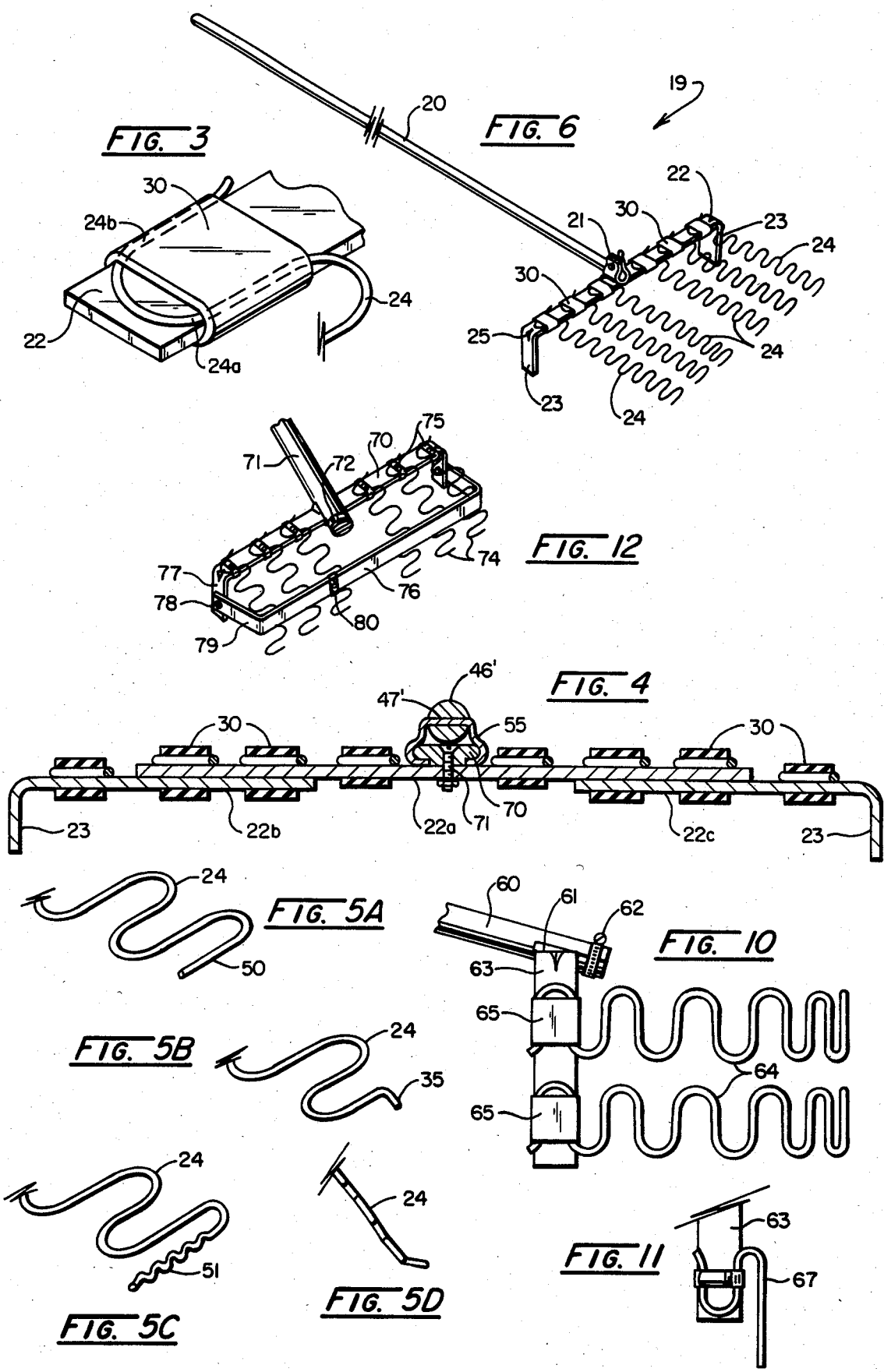

GARDENING TOOL

FIELD OF THE INVENTION

This invention relates to a gardening tool and more particularly to a gardening tool which is a rake having removable and highly flexible tines.

BACKGROUND OF THE INVENTION

Gardening tools, and particularly rakes, come in a variety of constructions. Depending upon the job to be performed, a rake is usually constructed with strong rigid tines or highly flexible tines. Flexible tines are particularly desirable where the earthen debris to be raked lies over rough uneven surfaces.

Rakes in the prior art which attempt to provide a flexible means for raking over a rough uneven surface can be found in U.S. Pat. No. 1,100,323—Ovens and my U.S. Pat. No. 4,414,797—Archer. In these patents the actual raking surfaces of the tines are restricted by their rigid attachment to a bridge and their inability to operate independent of one another. These examples of prior art patents have tines which cannot be repositioned by the operator to be closer or further apart from one another. Additionally, the prior art does not show a way to construct a rake which may advantageously be sold unassembled as a kit. The advantages of such a kit is that it permits inexpensive manufacturing and marketing to the public.

SUMMARY OF THE INVENTION

Briefly and in summary, this invention is a gardening tool having a handle, a bridge connected to one end of the handle, and a plurality of tines removably and readily attached to the bridge. Clamps are used to hold the tines to the bridge. The tines extend lineally in a arched manner, usually approximately parallel to the handle of the gardening tool, and together in unison, form a comb which allows the gardening tool to be used as a rake.

The tines themselves may be manufactured from numerous materials and take many different shapes. For example, in the preferred embodiment, the tines are fashioned from sinuous wave shaped metal wire, of which a terminating connecting bar of the lobe serves as the ground contact element (approximately 2 inches wide). The use of a sinuous wave shaped tine permits downward curved lobes to twist laterally while being raked over an uneven surface. Additionally the tines will flex vertically over high and low spots on the surface of the ground.

In the preferred embodiment the bridge of the gardening tool is generally lateral to the handle and constructed of at least one member with downward depending ends. Additional members can be added to overlap, and be held in position by adjustable clamps constructed of metal, preferably stainless steel, to adjust the length of bridge to accommodate additional tines. Length adjustment is by greater or lesser amounts of overlapping, held by the clamps. In this manner the bridge itself may be shortened or lengthened.

Each tine of this gardening tool is individually attached to the bridge. The attachment is such that the tines can be removed. This is achieved through the use of clamps. In the preferred embodiment circumferential banding clamps, conventionally known as "hose clamps" may be tightened by turning a "worm" type screw that interacts with the band. By turning the end of the screw the band is drawn tight in peripheral tension. In another embodiment, the clamps consist of annular, circular or tubular elastic material which press and hold the surface of the tines against the surface of the bridge by the elastic tension in the material. The hose clamps, in addition to holding the tines onto the bridge, can also be used to hold overlapping bridge members together.

An object of this invention is to provide a gardening tool for use as a rake which has tines that are very flexible and which follow the contour of a rough surface. This invention achieves this purpose in part by providing a means of attaching rake tines to the bridge element of the rake which holds them firmly, but permits them to flex and to be moved closer or further apart from one another. The structure which lends itself to meet this object has the additional advantage of providing the elements of a rake which can be provided to the ultimate operator in a kit for self-assembly.

The foregoing and other advantages of the invention will become apparent from the following disclosure in which a preferred embodiment of the invention is described in detail and illustrated in the accompanying drawings. It is contemplated that variations in procedures, structural features and arrangement of parts will appear to the person skilled in the art, without departing from the scope or sacrificing any of the advantages of the invention.

DESCRIPTION OF THE DRAWINGS

FIG. 3 is a perspective view of the clamp shown in FIGS. 4 and 6 which holds the tines onto the bridge of the tool.

FIG. 4 is a cross-sectional view of a bridge made of more than one member and having a plurality of tines, each held by a separate tubular elastic clamp.

FIGS. 5A-5D are perspective views of the tines of various forms which can be applied in this invention.

FIG. 6 is a perspective view of another embodiment of the invention.

FIG. 10 is an elevational view of still another embodiment of this invention showing another manner in which the components of this invention may be assembled.

FIG. 11 is an elevational view of a portion of a leg element of this invention.

FIG. 12 is a perspective view of another embodiment of this invention showing a different manner in which the components may be assembled.

DETAILED DESCRIPTION OF THE INVENTION

Figures 1, 2, 7, 8, 9:
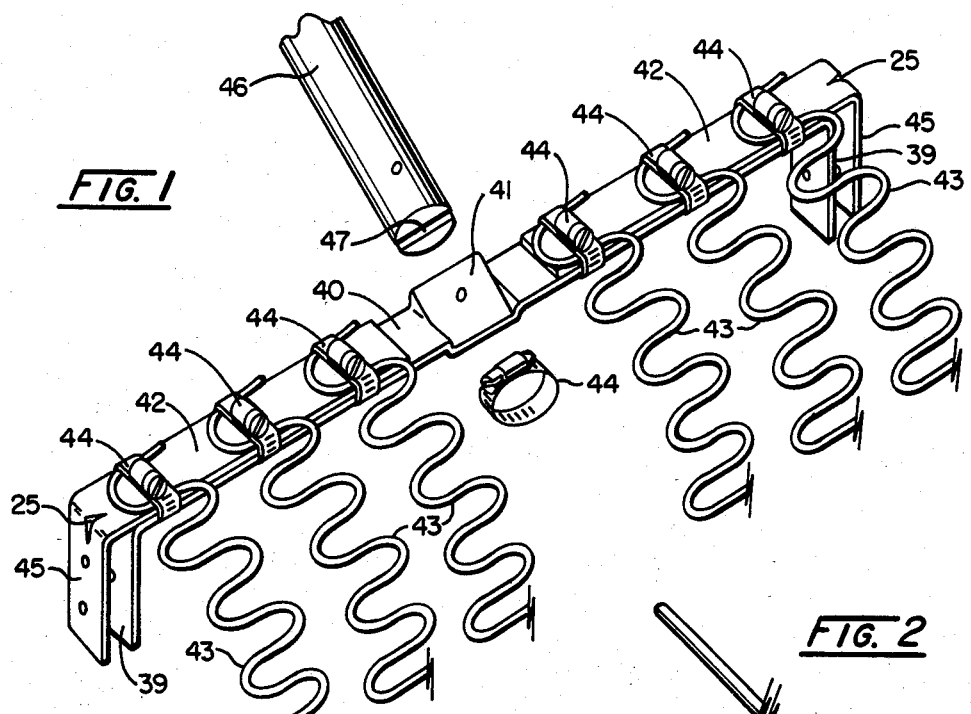
FIG. 1 is a perspective view of a portion of the preferred embodiment of the bridge, clamp, and terminal bridge elements forming a part of this invention.
FIG. 2 is an elevational side view of the embodiment of this invention shown in FIG. 1.
FIG. 7 is a perspective view of a portion of another embodiment of the handle and clasp device of this invention.
FIG. 8 is a perspective view of another embodiment of this invention showing a different manner in which the components may be assembled.
FIG. 9 is still another embodiment of this invention showing a still further manner in which the components of the invention may be assembled.

Referring to FIG. 1, a bridge member 40, having transersely downward depending end 39, including a central twisted portion 41, is assembled with a terminal bridge element 42 and tines 43 by screw operated hose clamps 44. The terminal elements 42 have leg portions 45. The clamps 44 operate as circumferential banding clamps that are drawn tight in peripheral tension to press and hold the members together.

A handle 46 is provided with a transverse longitudinal groove 47 into which the twisted portion 41 of the bridge 40 may be transversely engaged and passed through. A screw "hose" clamp 44 is in circumferential banding position to provide peripheral tension on the end, thus tightening the sides of the longitudinal groove on the twisted bridge portion 41.

The tines 43 are constructed of a form retaining elastic material such as spring steel wire or a synthetic plastic resin. The thickness and strength may be selected by those skilled in the art to accomplish the result of moving the debris material by having an elastic response to the slope of the earth over which the rake moves.

The handle 46 is elongated and cylindrical and may be made from an inexpensive material such as wood. Other shapes and varying lengths may be used to construct the handle. Alternative embodiments of attaching the handle 46 to a bridge 40 are described further in this disclosure.

The bridge portion 40 extends laterally on both sides of the centrally located twisted portion 41. The bridge can be manufactured in a single element and material, or as displayed in FIG. 4, made of more than one element. The bridge portion 40 is constructed with depending leg elements 39. The terminal elements may have gussets 25 to stiffen the corners.

Referring to FIG. 2, the handle 46 is connected to the bridge element 40, as shown in closer detail in FIG. 1. The leg element 39 is positioned for substantially perpendicular contact with the ground and the tines 43 are curved in a arch with the ends 35, such as shown in FIG. 5B, more or less perpendicular to the ground.

As shown in FIG. 4, the bridge may be comprised of a single center element 22a with two terminal elements 22b and 22c at opposing ends. The bridge 22 made in this manner can be varied in its length. By extending the opposing ends 22b and 22c away from each other, the length of the bridge is increased. With an increased length more tines can be added to increase the width of swath and extend coverage of raked over area. The distance between individual tines 24 can also be increased. The opposing terminal bridge elements 22b and 22c can be slideably attached to the central bridge element 40 in many different ways.

In the preferred embodiment of FIG. 1, the clamps 44, which removably affix the tines to the bridge element 40, are also used to hold the terminal bridge elements 42 to the central bridge 40. Other "perma clamp" methods to slideably clamp the terminal bridge elements 42 to a central bridge element 40 can include elongated slots or holes through which screws are passed and affixed with nuts.

Referring to FIGS. 3 and 4, one manner of removeably affixing tines 24 to a bridge element 22 with an elastic tubular clamp 30 is illustrated. This clamp 30 can be made from numerous materials such as elastic plastic or rubber materials. These clamps must be elastic enough to stretch and slide about the bridge element 22 and over the tine 24, but not so elastic as to allow the tine 24 to be pulled out of the clamp 30 while the gardening tool is in use. The use of an elastic plastic material as a clamp 30 permits a user to adjust and change tines without tools (screwdrivers). Elastic clamps allow the tine 24 to flex to a greater degree up and away from the bridge element 22 but not across the bridge element.

The tubular elastic clamps have also been found useful to attach one sinuous tine 24 to another sinuous tine 24 by inserting a lobe of each tine in the same tubular elastic clamp. The action of tines is stiffened and/or lengthened by this attachment.

Referring to FIG. 3, the positioning of the lobe of a sinuous wave tine 24 over a bridge element 22 is illustrated. In this construction, portions of the sinuous wave forming the tine portions 24a and 24b are shown. Portions 24a and 24b are located at the edge of the bridge 22 such that the clamp 30 prevents the tine 24 from sliding across the width of the bridge 22. Where a tine 24 is not made of sinuous wave wire, other means for holding the tine 24 firmly to the bridge 22 could be used. For example, a less sinuous tine could have a tab portion (not illustrated) which is equal to the width of the bridge element 22. A clamp 30 could be wrapped about the bridge portion 22 and the tab portion of the tine.

The preferred embodiment of this gardening tool uses sinuous wave curve wires for tines to maximize the flexibility of the tines. The use of this construction permits the tine to flex along its length projecting outward and away from the bridge 40 and also permits twisting about this length. The tine can be held to the bridge at different stations along its length thereby effectively changing the resistance of the elastic response (stiffening or relaxing the tine). When a terminal portion 51, as illustrated in FIG. 5c, is provided on a tine 24, additional teeth are available for raking or picking up debris. The use of a terminal portion 50, as illustrated in FIG. 5A, with a sinuous wave tine 24, will allow the terminal portion 50 to follow curves along the surface of the ground being raked. As the curves in the ground rise or fall, the flex along the tine's length will compensate for the change in elevation. If a curve is presented on the surface of the earth, and it slants either to the left or right of the gardening tool 19, the ability of the sinuous wave tine 24 to twist permits the terminal end 50 to follow the left or right curvature of the ground.

Another advantageous manner of using the gardening tool 19 is in the inverted position. When used thus, the flexibility and reverse curvature of the tines 24 assist in smoothing out the loose material on the ground.

The terminal portion 50 of the tines 24 can have other shapes and even vary in shape from tine to tine. For example, a single tooth 35, as shown in FIG. 5B, can extend downward to be used for normal lawn raking purposes. A tine end 50 that is lateral to the work surface is shown in FIG. 5A. Tines 24 having different terminal ends can be supplied in a kit. The plastic comb of my U.S. patent application, Ser. No. 526,271 could be attached to bridge legs, as could be the comb of my U.S. Pat. No. 4,414,797. The user can select tines of a single shape or combine different shapes depending upon the purposes of the intended use of the gardening tool 19.

A side view of a tine which is curved to meet the ground at a tangent or flatwise is shown in FIG. 5D.

Kits made according to this invention would have the benefit of not requiring final assembly at the manufacturing location. The various elements of the gardening tool can then be sold in an elongated narrow container, saving the manufacturer the expense in manpower and machinery required for the final assembly of the gardening tool 19. The average consumer of the gardening tool 19 will have no problem in assembling the various parts after purchase and removal from the container.

Referring to FIG. 6, a gardening tool 19 comprises a handle 20 affixed to a bridge portion 22. In the embodiment shown, the handle 20 is affixed by a clasp 21. This embodiment uses sinuous wave shaped tines 24 which extend from the bridge 22 longitudinally to the handle 20. These sinuous tines 24 are removeably attached to the bridge by elastic clamps. In this embodiment each individual tine 24 is affixed by an individual clamp 30.

Lateral spacing between tines 24 on the bridge portion 22 may be varied as desired to fit the circumstances of use.

Referring to FIG. 7, as well as FIG. 4, a handle 46' having a groove 47' is adapted to receive a retainer/clip 55. The clip is held in place by a clamp 44, of the type disclosed and discussed with respect to FIG. 6. The clip/retainer 55 could be used to hold the stem of the yoke disclosed and claimed in my U.S. Pat. No. 4,414,797 which is included herein by reference.

As shown in FIG. 4, retainer clip 55 is constructed to fit over and around the edges of a bracket 70, which is fastened to the bridge element 22a by a bolt 71.

Referring to FIG. 8, a handle 56 having a groove 57 is adapted to receive a terminal end 22b, 22c, 42 retained by a clamp 44. At the end of the leg 23, a clamp 44 retains a sinuous tine 24 at opposite ends to form a circular rake or scarifier. The embodiment of FIG. 8 may be assembled from the various components provided for the apparatus shown in FIG. 1 and otherwise previously discussed herein.

FIG. 9 discloses a handle having a groove 57 in which a leg 23 of a terminal element 22 is retained by a clamp 44. Tines 24 are assembled to the leg 23 by clamps 44 to make a narrower rake when such is more useful.

Referring to FIG. 10, a handle 60 fastened to a bridge member 61 with a clamp 62. The bridge element 61 has depending ends 63 to which are attached combs of tines 64 by means of elastic clamps 65, in a manner and for the purposes described in my U.S. Pat. No. 4,414,797 which is included herein by reference.

It has been found that the embodiment of the invention disclosed in FIG. 10 is additionally useful in moving snow in a manner similar to a "snow shovel". The comb and cover disclosed in my U.S. patent application, Ser. No. 526,271 now U.S. Pat. No. 4,520,621 may be combined with the bridge element 61 of this invention to provide a very useful device for moving snow.

As seen in FIG. 11, a dethatching tine 67 having a lobe 68 is clamped beneath hose clamp 69 for attachment to a leg end 63. Dethatching tine 69 is elongated below the end of the leg 63 to present a point to the ground.

Referring to FIG. 12, a bridge member 70 is fastened in a handle 71 by a clamp 72. Tines 74 are fastened to the bridge member 70 by means of clamps 75 as previously described in other embodiments. A second bridge element 76 is connected to an end 77 of the bridge element 70 by fastener means 78 at an end 79. An additional clamp 80 fastens the second bridge element 76 to a tine 74 flexibly positioning the second bridge element 76, advantageously to support and maintain an open cage or basket-like assembly. Additional clamps 80 may be positioned in connection with other tines for further rigidity and support. In addition, the clamp or clamps 80 may be located at selected different tine positions to establish a preferred degree of elasticity versus rigidity in the assembly.

By this arrangement, changing resistance to the ground yet retaining individual response of tines, allows for advantageous adjustment. Also the second bridge element serves as a catch bar aiding and holding debris.

It is herein understood that although the present invention has been specifically disclosed with the preferred embodiment and examples, modifications and variations of the concept herein disclosed may be resorted to by those skilled in the art. Such modifications and variations are considered to be within the scope of the invention and the appended claims.

I claim:
1. A gardening tool comprising:
   (a) a handle with a bridge member laterally connected to one end; and
   (b) at least one tine of a sinuous wave shape and at least one banding clamping means readily and removably clamping each at least one tine on the bridge member by tension in each individual banding clamping means and compression on the bridge member, the banding clamping means being readily removable by reducing the tension in the banding clamping means and reducing the compression of the tine on the bridge member, without removing the banding clamping means.

2. A garden tool according to claim 1, wherein said tines are manufactured from a synthetic resin material.

3. A garden tool according to claim 1, wherein said tines are manufactured from a metallic material.

4. A garden tool according to claim 3, wherein said metallic material is spring wire.

5. A garden tool according to claim 3 wherein additional overlapping extension members are provided on the bridge member and held in place by the clamping means.

6. A garden tool according to claim 1 wherein dethatching tine is attached to a bridge leg by an adjustable circumferential banding clamp.

7. A garden tool according to claim 1 wherein at least one additional second bridge member is pivotally connected to the first bridge member at the end and is clamped to at least one tine.

8. A gardening tool comprising:
   (a) a handle with a bridge member laterally connected to one end; and
   (b) at least one tine of a sinuous shape and at least one clamping means readily and removably clamping each at least one tine on the bridge member by tension in the clamping means, the clamping means being readily removable by change in the tension in the clamping means, with each single tine attached by a single clamping means.

9. A garden tool according to claim 8 wherein said clamps comprise circumferential metal banding clamps that are drawn tight in peripheral tension to press and hold the at least one tine on the surface of the bridge member.

10. A garden tool according to claim 8, wherein said clamps are made of a tubular elastic material.

11. A garden tool according to claim 8 wherein the tines are fastened one to another by inserting a lobe of one tine in a tubular elastic clamp with the lobe of another tine.

12. An unassembled garden tool kit in a container comprising a handle, a bridge connectable to one end of the handle, a plurality of tines of a sinuous wave form and a plurality of clamping bands circumferentially assemblable over the various wave form of the tines and the bridge to clamp and affix the tines in operable position on the bridge when removed from the container and assembled.

13. In a garden tool rake construction according to claim 12, the improvement comprising attaching the handle to the bridge member with the outer surface of the bridge member engaged transversely through a longitudinal groove in the end of the handle and a circumferential banding clamp on the end of the handle and over the extension of the sides of the handle on each side of the groove.

14. In a garden tool rake construction having a longitudinal handle attached to a lateral bridge member and tines attached to the bridge at contiguous surfaces, the improvement comprising attaching the tines to the bridge member with circumferential metal adjustable banding clamps that are drawn tight in peripheral tension to press and hold the surface of the tines against the surface of the bridge member.

15. In a garden tool rake construction having a longitudinal handle attached to a lateral bridge member, and tines attached to the bridge at contiguous surfaces, the improvement comprising attaching the tines to the bridge member with circumferential metal adjustable banding clamps that are drawn tight by peripheral tension to press and hold the surface of the tines against the surface of the bridge member, the bridge member being made of a single element with downward depending ends at each side, and having a centrally located twisted channel formed by generating an angle to position and stabilize the handle, the channel member passing through a longitudinal groove in the end of the handle to attach and secure the handle to the bridge.

16. A garden tool comprising:
(a) a handle;
(b) with a bridge connected to one end of the handle, the bridge being laterally disposed to the principle axis of the handle and having generally transversely depending end elements; and
(c) a comb element of sinuous wave shape, clamped to the transversely depending ends of the bridge member.

17. A garden tool comprising:
(a) a handle;
(b) with a bridge connected to one end of the handle, the bridge being laterally disposed to the principle axis of the handle and having generally transversely depending end elements; and
(c) a comb of a sinuous wave shape formed at the edge of a plastic band and supporting a cover attached to the transversely depending ends of the bridge member.

* * * * *